United States Patent
Billmaier et al.

(10) Patent No.: US 7,735,102 B1
(45) Date of Patent: Jun. 8, 2010

(54) SYSTEM AND METHOD FOR FOCUSED NAVIGATION WITHIN A USER INTERFACE

(76) Inventors: James A. Billmaier, 22322 NE. 157th St., Woodinville, WA (US) 98072; John M. Kellum, 303 E. Pike St., #PH5, Seattle, WA (US) 98122; Dewey Reid, 42 Oak Mountain, San Rafael, CA (US) 94903; Philip Rogan, 138 McGee Dr., Bozeman, MT (US) 59715

( * ) Notice: Subject to any disclaimer, the term of this patent is extended or adjusted under 35 U.S.C. 154(b) by 1642 days.

(21) Appl. No.: 10/113,889

(22) Filed: Mar. 29, 2002

Related U.S. Application Data

(63) Continuation-in-part of application No. 10/097,174, filed on Mar. 12, 2002, now abandoned.

(60) Provisional application No. 60/315,731, filed on Aug. 29, 2001, provisional application No. 60/317,612, filed on Sep. 6, 2001, provisional application No. 60/324,997, filed on Sep. 26, 2001.

(51) Int. Cl.
*G06F 3/00* (2006.01)
(52) U.S. Cl. .............................. 725/37; 725/39; 725/40; 725/52; 345/676
(58) Field of Classification Search ....................... None
See application file for complete search history.

(56) References Cited

U.S. PATENT DOCUMENTS

| | | | |
|---|---|---|---|
| 5,398,074 A | 3/1995 | Duffield et al. ............. 348/564 |
| 5,524,195 A | 6/1996 | Clanton, III et al. ........ 395/155 |
| 5,583,560 A | 12/1996 | Florin et al. | |
| 5,585,838 A * | 12/1996 | Lawler et al. ................. 725/54 |
| 5,602,596 A | 2/1997 | Claussen et al. ............ 348/564 |
| 5,606,374 A | 2/1997 | Bertram ...................... 348/565 |
| 5,619,249 A | 4/1997 | Billock et al. | |
| 5,621,456 A | 4/1997 | Florin et al. ................... 348/7 |

(Continued)

FOREIGN PATENT DOCUMENTS

EP  1 028 570 A1  8/2000

(Continued)

OTHER PUBLICATIONS

Nokia Mediaterminal 511S; www.nokia.com/multimedia/pdf/mediaterminal.pdf; pp. 1-12; Dec. 11, 2001.

(Continued)

*Primary Examiner*—Joseph P. Hirl
*Assistant Examiner*—Fred Peng
(74) *Attorney, Agent, or Firm*—Kory D. Christensen; Stoel Rives LLP

(57) ABSTRACT

A sequence of cards is stored that graphically represents available options within an information system. In addition, supplemental information related to at least one card may be obtained. In response to a single user action, the sequence of cards is successively displayed within a focus area of the user interface. When a card having supplemental information is displayed, the supplemental information is also displayed, either on or near the card. In response to a subsequent user action, the successive display is discontinued to display a particular card representing a selected option.

44 Claims, 13 Drawing Sheets

U.S. PATENT DOCUMENTS

| | | | | |
|---|---|---|---|---|
| 5,623,613 | A | 4/1997 | Rowe et al. | 395/353 |
| 5,633,657 | A | 5/1997 | Falcön | |
| 5,663,757 | A | 9/1997 | Morales | 346/13 |
| 5,673,401 | A | 9/1997 | Volk et al. | 395/327 |
| 5,677,708 | A | 10/1997 | Matthews, III et al. | 345/115 |
| 5,682,511 | A | 10/1997 | Sposato et al. | 395/353 |
| 5,781,872 | A | 7/1998 | Konishi et al. | |
| 5,812,124 | A | 9/1998 | Eick et al. | 345/327 |
| 5,838,326 | A | 11/1998 | Card et al. | 345/355 |
| 5,850,218 | A | 12/1998 | LaJoie et al. | 345/317 |
| 6,002,394 | A * | 12/1999 | Schein et al. | 725/39 |
| 6,005,601 | A | 12/1999 | Ohkura et al. | 348/7 |
| 6,020,930 | A | 2/2000 | Legrand | 348/569 |
| 6,028,600 | A | 2/2000 | Rosin et al. | 345/327 |
| 6,037,933 | A | 3/2000 | Blonstein et al. | 345/327 |
| 6,046,722 | A | 4/2000 | McKiel, Jr. | 345/145 |
| 6,118,492 | A | 9/2000 | Milnes et al. | |
| 6,151,059 | A | 11/2000 | Schein et al. | 348/13 |
| 6,163,345 | A | 12/2000 | Noguchi et al. | 348/564 |
| 6,175,362 | B1 | 1/2001 | Harms et al. | 345/327 |
| 6,177,931 | B1 | 1/2001 | Alexander et al. | |
| 6,188,406 | B1 | 2/2001 | Fong et al. | 345/348 |
| 6,201,540 | B1 | 3/2001 | Gallup et al. | |
| 6,262,722 | B1 | 7/2001 | Allison et al. | 345/327 |
| 6,266,098 | B1 | 7/2001 | Cove et al. | 348/563 |
| 6,281,940 | B1 | 8/2001 | Sciammarella | 348/564 |
| 6,295,062 | B1 | 9/2001 | Tada et al. | 345/348 |
| 6,344,880 | B1 | 2/2002 | Takahashi et al. | 348/563 |
| 6,425,129 | B1 | 7/2002 | Sciammarella et al. | 725/38 |
| 6,445,306 | B1 | 9/2002 | Trovato et al. | |
| 6,481,011 | B1 | 11/2002 | Lemmons | |
| 6,522,342 | B1 | 2/2003 | Gagnon et al. | |
| 6,535,888 | B1 | 3/2003 | Vijayan et al. | |
| 6,536,041 | B1 * | 3/2003 | Knudson et al. | 725/39 |
| 6,538,672 | B1 | 3/2003 | Dobbelaar | 345/810 |
| 6,564,378 | B1 | 5/2003 | Satterfield et al. | |
| 6,577,350 | B1 | 6/2003 | Proehl et al. | 348/564 |
| 6,613,100 | B2 | 9/2003 | Miller | 715/526 |
| 6,642,939 | B1 | 11/2003 | Vallone et al. | 345/721 |
| 6,678,891 | B1 | 1/2004 | Wilcox et al. | 725/42 |
| 6,690,391 | B1 * | 2/2004 | Proehl et al. | 715/720 |
| 6,698,021 | B1 | 2/2004 | Amini et al. | |
| 6,725,215 | B2 | 4/2004 | Yamamoto | |
| 6,728,675 | B1 | 4/2004 | Maddalozzo, Jr. et al. | 704/258 |
| 6,756,997 | B1 | 6/2004 | Ward, III et al. | |
| 6,769,128 | B1 | 7/2004 | Knee et al. | |
| 6,789,263 | B1 | 9/2004 | Shimada et al. | |
| 6,934,917 | B2 | 8/2005 | Lin | 715/811 |
| 6,976,228 | B2 | 12/2005 | Bernhardson | |
| 6,978,472 | B1 | 12/2005 | Nashida et al. | |
| 7,065,710 | B2 | 6/2006 | Hayashi et al. | |
| 7,139,983 | B2 | 11/2006 | Kelts | |
| 7,260,829 | B1 | 8/2007 | Hendricks et al. | |
| 2001/0013126 | A1 | 8/2001 | Lemmons et al. | |
| 2002/0033848 | A1 | 3/2002 | Sciammarella et al. | 345/838 |
| 2002/0044226 | A1 | 4/2002 | Risi | |
| 2002/0049972 | A1 | 4/2002 | Kimoto | |
| 2002/0054068 | A1 * | 5/2002 | Ellis et al. | 345/716 |
| 2002/0056129 | A1 | 5/2002 | Blackketter et al. | 725/112 |
| 2002/0070958 | A1 | 6/2002 | Yeo et al. | 345/723 |
| 2002/0078440 | A1 | 6/2002 | Feinberg et al. | 725/9 |
| 2002/0152474 | A1 | 10/2002 | Dudkiewicz | 725/136 |
| 2002/0174444 | A1 | 11/2002 | Gatto et al. | |
| 2002/0184634 | A1 * | 12/2002 | Cooper | 725/51 |
| 2003/0001898 | A1 | 1/2003 | Bernhardson | 345/786 |
| 2003/0001907 | A1 | 1/2003 | Bergsten et al. | |
| 2003/0052900 | A1 | 3/2003 | Card et al. | |
| 2003/0063798 | A1 | 4/2003 | Li et al. | |
| 2003/0084452 | A1 | 5/2003 | Ryan et al. | |
| 2003/0090524 | A1 | 5/2003 | Segerberg et al. | 345/186 |
| 2003/0093792 | A1 | 5/2003 | Labeeb et al. | 725/46 |
| 2003/0117440 | A1 | 6/2003 | Hellyar et al. | |
| 2005/0172319 | A1 * | 8/2005 | Reichardt et al. | 725/52 |
| 2005/0278759 | A1 * | 12/2005 | Unger | 725/89 |
| 2005/0283810 | A1 * | 12/2005 | Ellis et al. | 725/93 |

FOREIGN PATENT DOCUMENTS

| | | |
|---|---|---|
| KR | 10-2002-0013868 | 2/2002 |
| WO | WO 00/33566 | 6/2000 |
| WO | WO 00/65429 | 11/2000 |

OTHER PUBLICATIONS

Nokia Mediamaster 9470S; http://www.digitv.de/ifa01/nokia9470s.shtml;pp. 1-2; Dec. 11, 2001.
U.S. Appl. No. 10/097,174, filed Mar. 12, 2002, Billmaier et al.
U.S. Appl. No. 10/105,088, filed Mar. 22, 2002, Billmaier.
U.S. Appl. No. 10/105,083, filed Mar. 22, 2002, Billmaier.
U.S. Appl. No. 10/097,195, filed Mar. 12, 2002, Billmaier et al.
U.S. Appl. No. 10/108,178, filed Mar. 27, 2002, Billmaier et al.
U.S. Appl. No. 10/107,601, filed Mar. 27, 2002, Billmaier et al.
U.S. Appl. No. 10/113,820, filed Mar. 29, 2002, Billmaier et al.
U.S. Appl. No. 10/186,209, filed Jun. 27, 2002, Istvan et al.
U.S. Appl. No. 10/186,210, filed Jun. 27, 2002, Billmaier et al.
U.S. Appl. No. 10/230,964, filed Aug. 29, 2002, Istvan et al.
U.S. Appl. No. 10/260,700, filed Sep. 30, 2002, Billmaier et al.
U.S. Appl. No. 10/270,738, filed Sep. 30, 2002, Billmaier et al.
U.S. Appl. No. 10/260,208, filed Sep. 30, 2002, Billmaier et al.
U.S. Appl. No. 10/328,754, filed Dec. 23, 2002, Rappaport et al.
U.S. Appl. No. 10/259,199, filed Sep. 27, 2002, Young et al.
U.S. Appl. No. 10/138,810, filed May 3, 2002, Billmaier et al.
U.S. Appl. No. 10/138,805, filed May 3, 2002, Billmaier et al.
U.S. Appl. No. 10/138,803, filed May 3, 2002, Billmaier et al.
U.S. Appl. No. 10/183,804, filed May 3, 2002, Billmaier et al.
U.S. Appl. No. 60/317;612, filed Sep. 6, 2001, Reid et al.
U.S. Appl. No. 60/324,997, filed Sep. 26, 2001, Reid et al.
U.S. Appl. No. 10/186,094, filed Jun. 29, 2002, Billmaier et al.
U.S. Appl. No. 10/187,118, filed Jun, 29, 2002, Billmaier et al.
U.S. Appl. No. 10/186,095, filed Jun. 29, 2002, Billmaier et al.
U.S. Appl. No. 60/377,627, filed May 3, 2002, Billmaier et al.
U.S. Appl. No. 29/191,708, filed Jun. 3, 2002, Nguyen et al.
U.S. Appl. No. 10/251,366, filed Sep. 20, 2002, Allen et al.
U.S. Appl. No. 10/260,881, filed Sep. 3, 2002, Allen et al.
U.S. Appl. No. 10/320,900, filed Dec. 16, 2002, Kolde et al.
U.S. Appl. No. 10/328,514, filed Dec. 23, 2002, Kolde et al.
U.S. Appl. No. 10/260,738, filed Sep. 30, 2002, Billmaier et al.
Office Action mailed Oct. 19, 2006, for U.S. Appl. No. 10/097,174, filed Mar. 12, 2002.
Office Action mailed May 4, 2007, for U.S. Appl. No. 10/097,174, filed Mar. 12, 2002.
Office Action mailed Jan. 11, 2007, for U.S. Appl. No. 10/105,088, filed Mar. 22, 2002.
Office Action mailed Jul. 6, 2007, for U.S. Appl. No. 10/105,088, filed Mar. 22, 2002.
Office Action mailed Jun. 13, 2007, for U.S. Appl. No. 10/108,178, filed Mar. 27, 2002.
Office Action mailed Nov. 29, 2006, for U.S. Appl. No. 10/107,601, filed Mar. 27, 2002.
Office Action mailed Jun. 20, 2007, for U.S. Appl. No. 10/107,601, filed Mar. 27, 2002.
Office Action mailed May 24, 2007, for U.S. Appl. No. 10/186,209, filed Jun. 27, 2002.
Office Action mailed Jul. 5, 2007, for U.S. Appl. No. 10/186,210, filed Jun. 27, 2002.
Office Action mailed Jun. 29, 2007, for U.S. Appl. No. 10/328,754, filed Dec. 23, 2002.
Office Action mailed Dec. 13, 2007, for U.S. Appl. No. 10/186,209, filed Jun. 27, 2002.
Office Action mailed Dec. 13, 2007, for U.S. Appl. No. 10/186,210, filed Jun. 27, 2002.
Office Action mailed Dec. 26, 2007, for U.S. Appl. No. 10/105,088, filed Mar. 22, 2002.
Office Action mailed Jan. 24, 2008, for U.S. Appl. No. 10/108,178, filed Mar. 27, 2002.

Office Action mailed Jan. 22, 2008, for U.S. Appl. No. 10/260,738, filed Sep. 30, 2002.
Office Action mailed Mar. 5, 2008, for U.S. Appl. No. 10/328,754, filed Dec. 23, 2002.
Office Action mailed Jul. 29, 2008 in U.S. Appl. No. 10/097,174, filed Mar. 12, 2002.
Office Action mailed Jul. 3, 2008 in U.S. Appl. No. 10/105,088, filed Mar. 22, 2002.
Office Action mailed Jan. 22, 2009 in U.S. Appl. No. 10/108,178, filed Mar. 27, 2002.
Office Action mailed Jul. 31, 2008 in U.S. Appl. No. 10/108,178, filed Mar. 27, 2002.
Office Action mailed Apr. 27, 2009 in U.S. Appl. No. 10/186,209, filed Jun. 27, 2002.
Office Action mailed Feb. 18, 2009 in U.S. Appl. No. 10/186,210, filed Jun. 27, 2002.
Office Action mailed Aug. 4, 2008 in U.S. Appl. No. 10/186,210, filed Jun. 27, 2002.
Supplemental Notice of Allowability in U.S. Appl. No. 10/260,700, filed Sep. 30, 2002.
Office Action mailed Apr. 27, 2009 in U.S. Appl. No. 10/260,740, filed Sep. 30, 2002.
Office Action mailed Sep. 11, 2008 in U.S. Appl. No. 10/260,738, filed Sep. 30, 2002.
Office Action mailed Apr. 14, 2009 in U.S. Appl. No. 10/328,754, filed Dec. 23, 2002.
Office Action mailed Sep. 3, 2008 in U.S. Appl. No. 10/328,754, filed Dec. 23, 2002.
Office Action mailed Apr. 14, 2009 in U.S. Appl. No. 11/426,183, filed Jun. 23, 2006.

* cited by examiner

SYSTEM AND METHOD FOR FOCUSED NAVIGATION WITHIN A USER INTERFACE

RELATED APPLICATIONS

This application is a continuation-in-part of U.S. patent application Ser. No. 10/097,174, filed Mar. 12, 2002 now abandoned, for "System and Method for Focused Navigation within an Interactive Television User Interface." The present application is also related to and claims the benefit of U.S. Provisional Application No. 60/315,731, filed Aug. 29, 2001, entitled "System and Method for Visual Channel Surfing", which is hereby incorporated by reference in its entirety. The present application is further related to and claims the benefit of U.S. Provisional Application No. 60/317,612, filed Sep. 6, 2001, entitled "System and Method for Visual Channel Surfing", which is hereby incorporated by reference in its entirety. The present application is also related to and claims the benefit of U.S. Provisional Application No. 60/324,997, filed Sep. 26, 2001, entitled "System and Method for Visual Channel Surfing Using Center-Focused Navigation", which is hereby incorporated by reference in its entirety.

BACKGROUND

1. Field of the Invention

The present invention relates generally to the field of information systems. More specifically, the present invention relates to a system and method for focused navigation within a user interface of an information system.

2. Description of Related Background Art

Recent advances in technology have vastly increased the number of available options within personal computers (PCs), interactive television (ITV) systems, personal digital assistant (PDAs), cellular telephones, and other information systems. For instance, current ITV systems offer hundreds of broadcast channels and a variety of interactive options, including e-mail, videoconferencing, instant messaging, online banking, online purchasing, and so forth.

Unfortunately, despite technological advances, user interfaces for these systems have remained largely unchanged, making navigation through all of the newly available options no easy task. For example, a user of a modern ITV system must scan through potentially hundreds of channels and other options, often by repeatedly pressing a button on a remote control. Such an outdated approach is far too slow and inconvenient to facilitate effective operation of a modern ITV system.

Similar problems exist with PC interfaces. The graphical user interface (GUI) of a modern PC looks remarkably similar to the first GUI developed twenty years ago. Small icons representing user options are arranged in rows and columns on a graphical representation of a desktop. Many of the icons are identical, requiring the addition of text labels as a distinguishing feature. Typically, a user must individually examine each icon and read each label—a time-consuming process that does not lend itself to effective navigation of the numerous options available in a modern PC.

Accordingly, it would be an advancement in the art to provide a user interface that allows for rapid and efficient navigation of a plurality of options without the drawbacks of conventional approaches. In particular, it would be an advancement in the art to provide an interface in which a user need not repeatedly press a button to display each available option, as is often the case with conventional TV or ITV interfaces. Likewise, it would be an advancement in the art to provide an interface in which a user need not scan through an arrangement of multiple icons, as is the case in many conventional PC interfaces.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Reference throughout this specification to "one embodiment" or "an embodiment" means that a particular described feature, structure, or characteristic is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the following description makes particular reference to ITV systems, it should be recognized that the present invention may be used in conjunction with any type of information system in which selectable options may be displayed on a display screen. Examples of such information systems include, but are not limited to, ITV systems, personal computers, and mobile computing devices, such as PDAs, webpads, cellular telephones, and the like.

Figure 1:
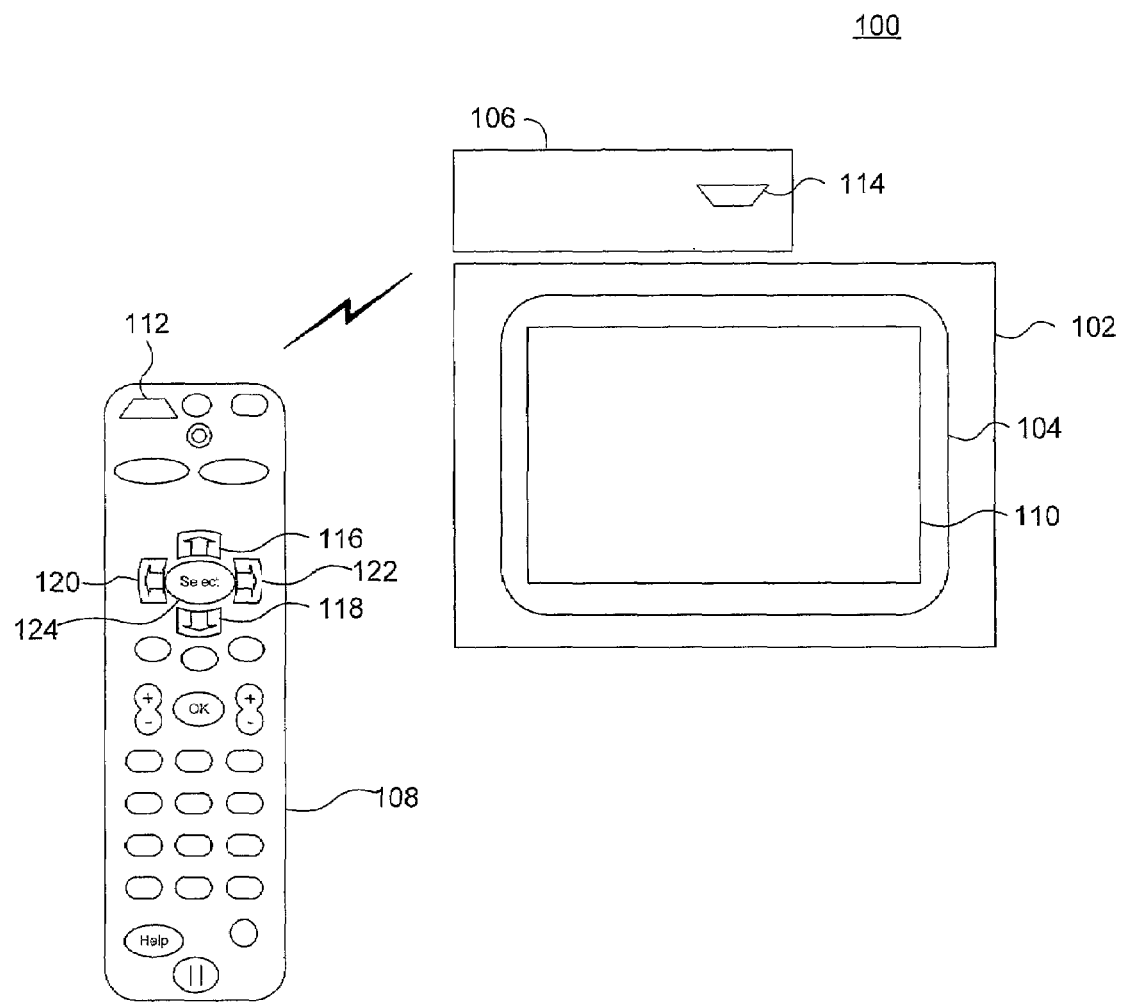
FIG. 1 is a block diagram of an ITV system.

Referring now to FIG. 1, there is shown a block diagram of an ITV system 100 according to an embodiment of the invention. In one configuration, the ITV system 100 includes a television (TV) 102 or other display device having a display screen 104, a set-top box (STB) 106, and a remote control 108.

The STB 106 serves as a gateway between the TV 102 and a broadband communication network (not shown), such as a cable television network or a direct broadcast satellite (DBS) network. One commercially-available example of an STB 106 is the Motorola DCT5000® interactive set-top terminal.

The STB 106 receives encoded television signals and other data from the broadband network and processes the same for display on the display screen 104. The STB 106 may also include hardware and software for presenting a graphical user interface (GUI) 110 on the display screen 104 for operating the various functions and services of the STB 106.

In alternative embodiments, the STB 106 may be integrated into the TV 102, a mobile computing device, or the like. In still other embodiments, the term "STB" may broadly encompass a personal computer (PC) that performs STB-like functions. In such an embodiment, a PC may be used to process TV signals and other data received from the broadband network. The PC may operate in the context of a home network to provide display signals to a variety of devices, including one or more television sets, computer monitors, personal digital assistants (PDAs), cellular phones, and the like. A variety of home networking systems and protocols may be used, such as Ethernet, 802.11b, Bluetooth, etc.

The remote control 108 is provided for convenient remote operation of the STB 106 and the TV 102. The remote control 108 may include a wireless transmitter 112 for transmitting control signals to a wireless receiver 114 within the STB 106 using radio frequency (RF) or infrared (IR) techniques.

In addition, the remote control 108 may include a number of buttons or other similar controls. For instance, the remote control 108 may include a "Up" button 116, a "Down" button 118, a "Left" button 120, a "Right" button 122, and a "Select" button 124. Of course, a variety of other buttons or controls may be provided within the scope of the invention. In alternative implementations, the remote control 108 may be embodied as a keyboard, mouse, or other suitable input device.

As noted, an ITV system 100 typically provides access to a plurality of selectable options, such as channels, programs, applications, digital media files, etc. For instance, an ITV system 100 may provide access to literally hundreds of broadcast TV channels, pay-per-view (PPV) channels, music channels, and the like. Additionally, an ITV system 100 may provide access to a number of interactive channels or applications, including web browsers, e-mail programs, chat clients, personal video recorder (PVR) applications, contact directories, and the like. Furthermore, an ITV system 100 may store or provide access to stored PVR recordings, digital photographs, audio (MP3) files, or other forms of digital media.

Figure 2:
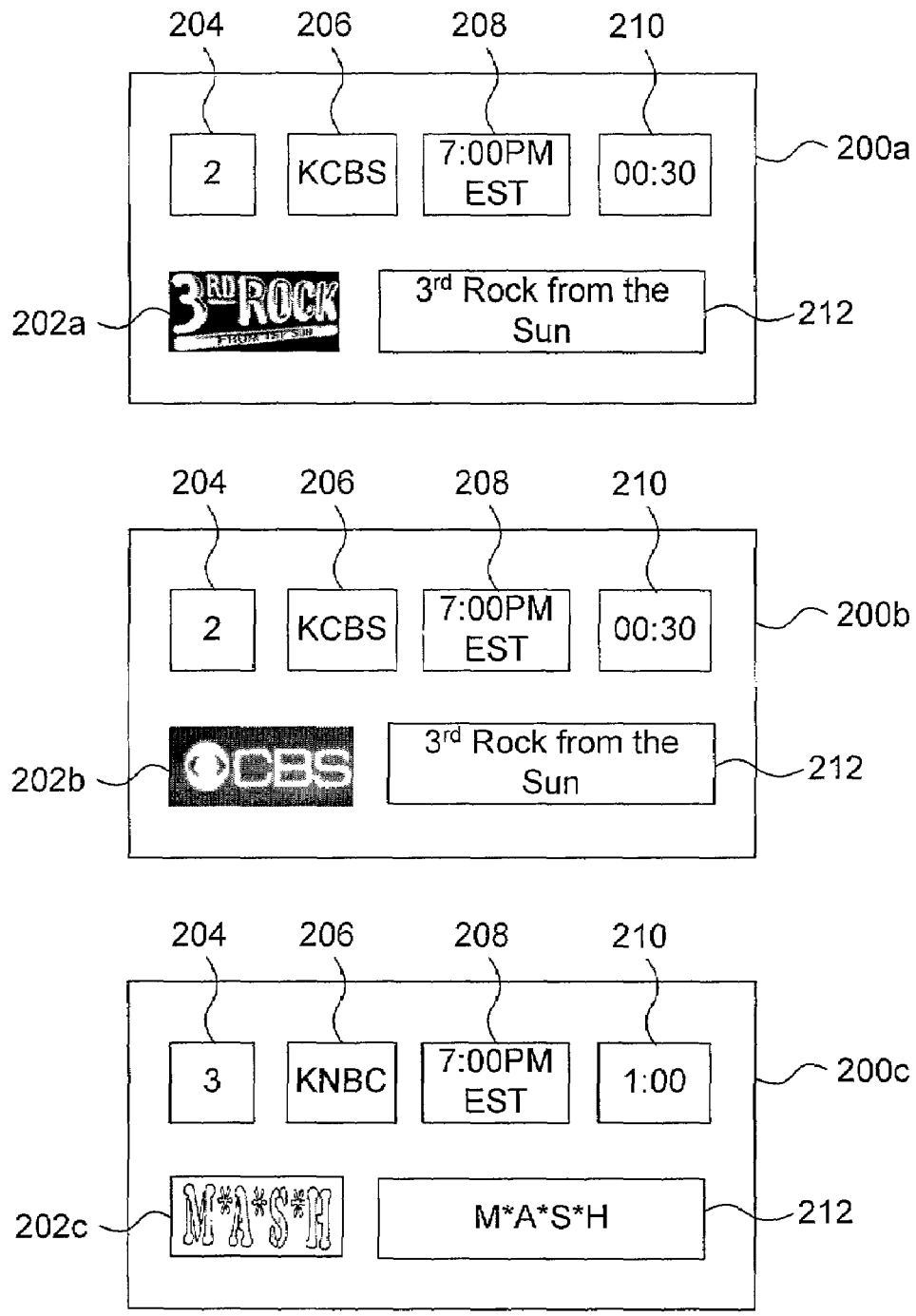
FIG. 2. is an illustration of a plurality of cards.

As shown in FIG. 2, each selectable option within the ITV system 100 may be associated with a card 200. A card 200 is an object or other suitable data structure that provides information about and/or access to an available option within an ITV system 100. A card 200 may be a container of all of the attributes, actions, and/or states needed to facilitate interaction with the option represented thereby. Cards 200 may be stored in any suitable format within a memory or disk drive of the ITV system 100.

Each card 200 may include a graphical representation 202 for display in the GUI 110, as described in detail below. The graphical representation 202 may include various types or combinations of artwork, digital photography, captured video frames, animations, or the like.

As depicted in FIG. 2, cards 200*a-c* may be used to represent television programs or channels. The television programs may be ongoing (live), upcoming, or previously-recorded. In addition to a graphical representation 202, such cards 200 may include, for instance, a channel number 204, a channel name or identifier 206, a starting time 208, a running time 210, and a text description 212. Of course, cards 200 representing other types of options may include additional or different types of information, such as audio/video clips, file or path names, network addresses (URLs), etc.

The graphical representations 202 associated with cards 200 may have different levels of specificity or granularity. For instance, a graphical representation 202*a* may correspond generally to a television series, e.g., "$3^{rd}$ Rock from the Sun", while another graphical representation 202*b* may correspond to a television station or network, e.g., "CBS". In other embodiments, a graphical representation 202 may correspond to a specific episode of a television series (e.g., a series premier), or even a product (purchase opportunity) associated with the television program. In still other embodiments, a generic graphical representation 202 may be provided, which may be overlaid by the channel number 204, text description 212, or other information, where a more specific card 200 is not available.

Cards 200 may be generated locally within an ITV system 100 or may be received via the broadband network using HTTP (hypertext transfer protocol), FTP (file transfer protocol), ATVEF (advanced television enhancement forum) triggers or other well-known protocols or techniques. In one embodiment, a card 200 may be received with data encoded in the vertical blanking interval (VBI) of a television signal. Additionally, information associated with cards 200 (e.g., channel number 204, starting time 208, running time 210) may be dynamically updated with information received in ATVEF triggers.

Figure 3:
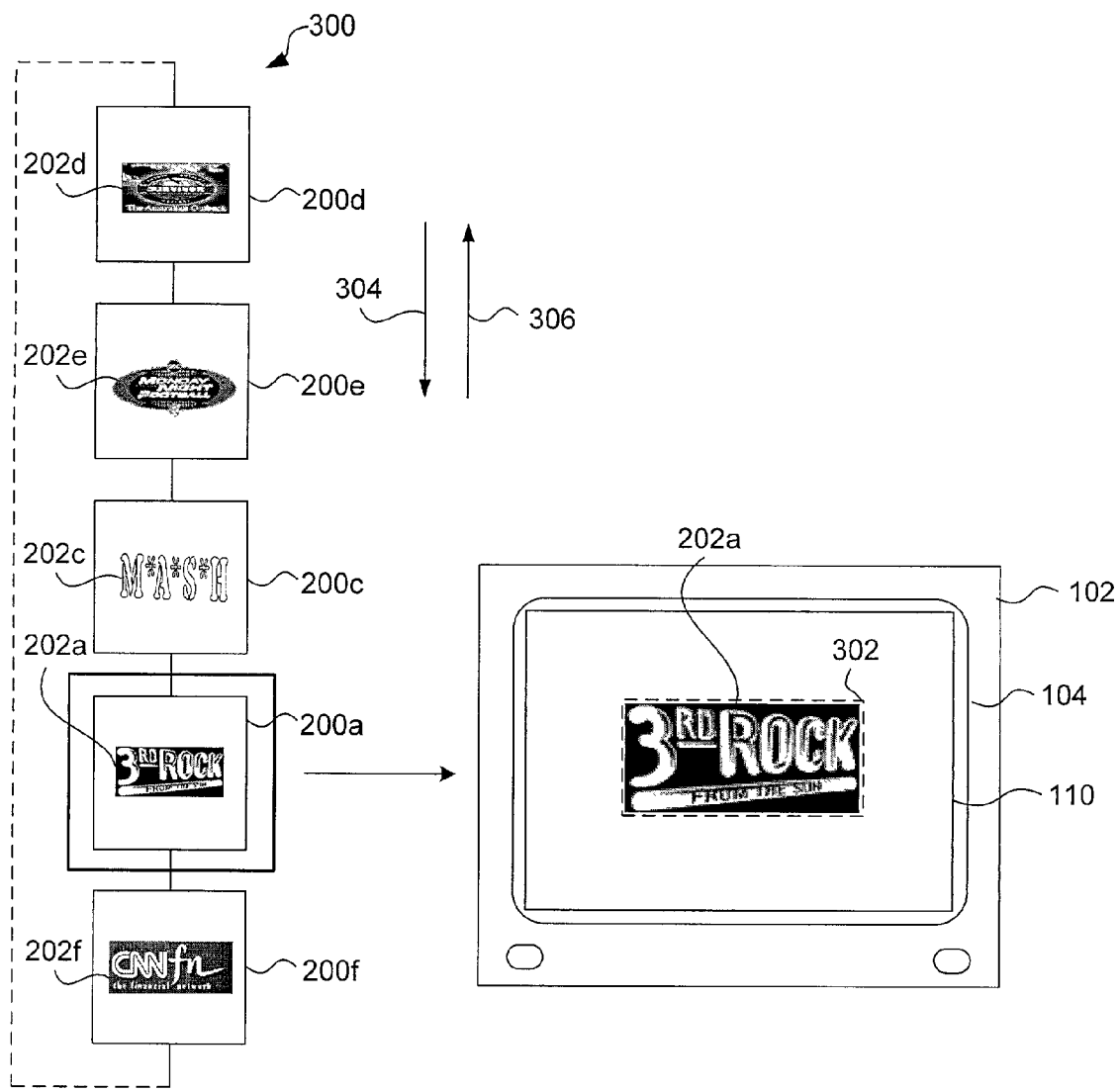
FIGS. 3-10 are illustrations of various techniques for focused navigation of a plurality of options within a user interface.

Referring to FIG. 3, a plurality of cards 200 may be linked or grouped together in a package or sequence 300. The sequence 300 may be circular (as depicted), linear, or configured in other ways. The sequence 300 may be linked in numerical order by channel number 204, in alphabetical order by the text description 212, or in other preset or user-defined ways. For instance, the sequence 300 may be determined based on one or a combination of other inputs, such as user profile information, user preferences, external events or data feeds (e.g., telephone rings, PVR notifications, alerts for external programming sources).

In the illustrated embodiment, one card 200*a* in the sequence 300 is active or in "focus". As shown, the active card 200*a* may be displayed within a focus area 302 of a GUI 110 displayed on the TV 102. For brevity, the phrase "displaying a card" refers herein to displaying a graphical representation 202 associated with the card 200. Other information associated with the card, e.g., the channel number 204 or text description 212, may or may not be displayed.

A focus area 302 is a single location of the GUI 110 at which the cards 200 are successively displayed (displayed one at a time in sequence). The focus area 302 may be located at a central or visually dominant location of the GUI 110, although the invention is not limited in this respect. As used herein, the term "focused navigation" refers to a technique of displaying a sequence 300 of cards 200 within a focus area 302.

In response to a single user action, the cards 200 in a sequence 300 are successively displayed within the focus area 302. Where the sequence 300 is circular, the successive display of cards 200 may continue indefinitely until halted by the user by a subsequent action, as described more fully below.

The single user action to initiate navigation may be pressing (or pressing and holding down) a button on the remote control 108. For example, the user may press the "Up" button 116 to initiate the successive display in a first direction within the sequence 300 (indicated by line 304), and press the "Down" button 118 to initiate navigation in the opposite direction (indicated by line 306). Alternatively, the user may speak a command into a microphone (either within the STB 106 or remote control 108) to initiate navigation. Of course, the user may initiate navigation in a variety of other ways within the scope of the invention.

In one embodiment, the sequence 300 of cards 200 is successively displayed at a rate selected by the user. For instance, initially pressing the "Up" button 116 may cause the sequence 300 to be displayed at a rate of two cards 200 per second. As the user continues to hold the "Up" button 116, the rate may increase gradually or in steps to any practical rate within the limit of a typical user's ability to recognize individual cards 200 when they are displayed. Many users are able to recognize individual cards 200 at a rate of seven or more cards 200 per second (420 per minute), facilitating rapid navigation of available options.

The cards 200, when displayed within the focus area 302, may be sufficiently large to permit user recognition from a comfortable viewing distance for the particular display screen 104. Thus, unlike PC icons, which typically occupy as little as 1/200 of the display area of the display screen 104, the displayed cards 200 (and the card 200 in the focus area 302 in particular) may occupy between 1/10 and 1/4 of the total display area.

When the user sees a card 200 being displayed of a channel or option that she desires to select or view, the user may take some additional action and the successive display of cards 200 is halted. For example, where navigation was initiated by pressing and holding down the "Up" button 116, the user may release the "Up" button 116 to discontinue navigation. In an alternative embodiment, where the successive display was initiated simply by pressing a button, the user may press the same or a different button to halt the successive display. Of course, the user may discontinue navigation in a variety of other ways within the scope of the invention.

If the user's reaction time is fast enough, the card 200 representing the desired channel remains displayed in the focus area 302 once navigation is discontinued. However, the user's reaction time may not be fast enough and one or more cards 200 may be subsequently displayed. In such a case, the user may manually backtrack to the desired card 200 by repeatedly activating a suitable control on the remote control 108. For example, briefly pressing the "Up" or "Down" buttons 116, 118 may result in the previous or next card 200, respectively, being displayed. Alternatively, as described in greater detail below, the ITV system 100 may attempt to determine the delay between the user recognizing the desired card 200 and taking the subsequent action and compensate for that delay by reverting to a previously-displayed card 200.

The user may select the channel or option associated with the displayed card 200 by taking a selection action. For instance, the user may press the "Select" button 124 on the remote control. Alternatively, the selection action may simply be waiting a set amount of time without activating any controls on the remote control 108.

The effect of activating the card 200 will vary dramatically depending on the type of card 200. For instance, in the case of a card 200 representing a live television program, the GUI 110 may be replaced by a full-size version of the program. Alternatively, activating a card 200 corresponding to a purchase opportunity may result in the display of a web browser directed to a particular website.

Figure 4:
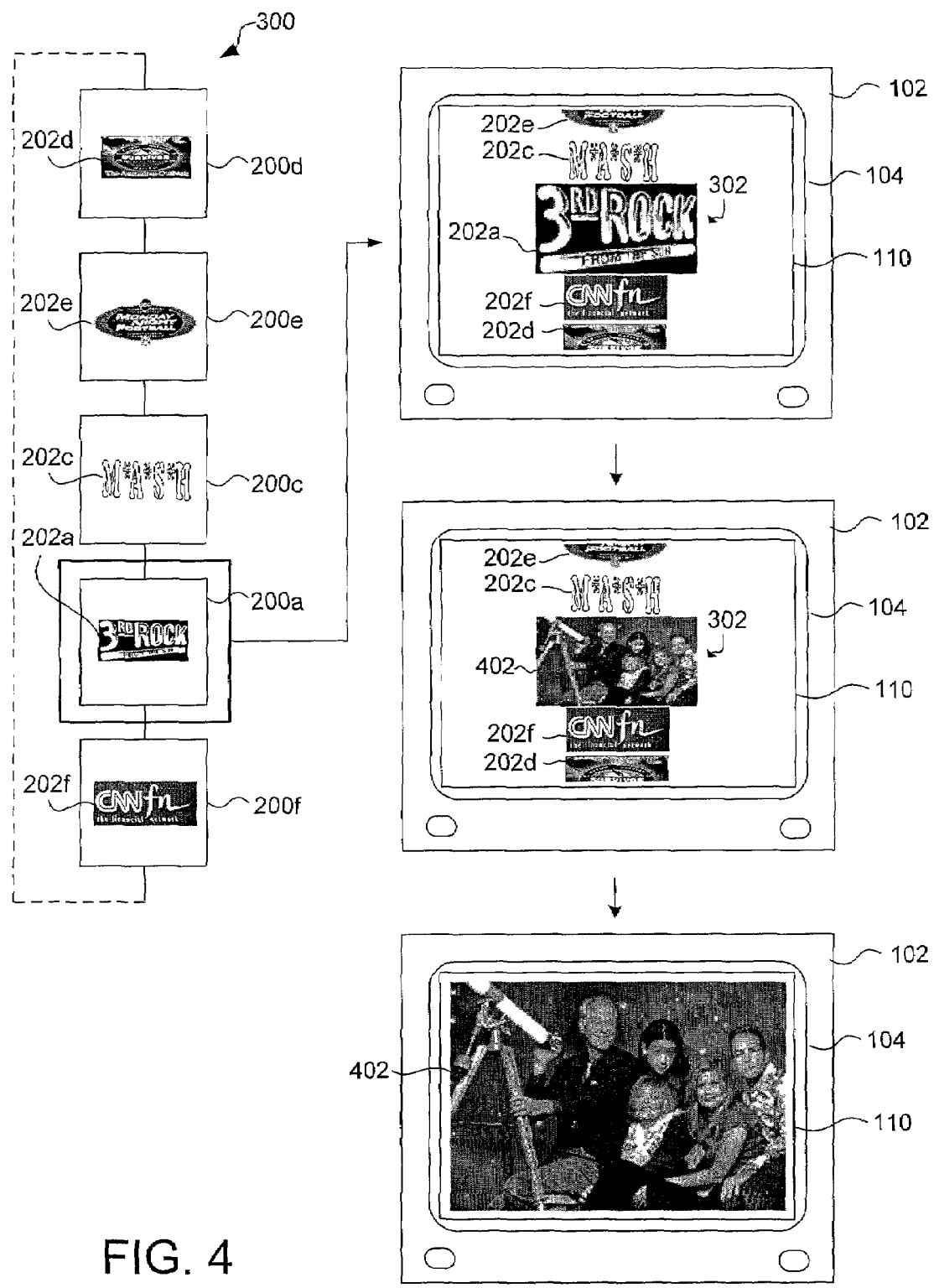

As shown in FIG. 4, one or more previous and next cards 200 within the sequence 300 may be displayed along an axis (not shown) of the GUI 110 to provide the user with a more complete navigational context within the sequence 300. In one embodiment, the axis is an imaginary line that extends across the GUI 110 in a particular direction and intersects the focus area 302. For example, at least a subset of the sequence 300 of cards 200 may be displayed along a vertical axis, with the active card 200a being displayed in the focus area 302. In alternative embodiments, the cards 200 may be displayed along horizontal or diagonal axes, or in other suitable ways.

Typically, one or more cards 200 in a sequence 300 are not displayed. These off-screen or hidden cards may be dynamically changed, replaced, or updated during navigation, e.g., a card 200 representing an advertisement may change from one sponsor to another.

When a user activates one of the navigation buttons of the remote control 108 (e.g., the "Up" or "Down" buttons 116, 118), the displayed cards 200 in the sequence 300 may be scrolled (e.g., shifted or cycled) downward or upward, respectively, with a new card (e.g., card 200c or 202f) entering the focus area 302. Alternatively, the "Left" or "Right" button 120, 122 may be used for the same purpose.

As depicted, the card 200a in the focus area 302 may be visually emphasized in various ways. For example, the card 200a may be enlarged relative to the other displayed cards 200. Alternatively, the card 200a may be animated, marked, illuminated, highlighted, or otherwise set apart from the other cards 200.

In certain embodiments, if the user allows a card 200 representing a live television program to remain in the focus area 302 for a certain amount of time (e.g., 2 seconds), the card 200a may be overlaid by a video window 402 showing the live television program. Furthermore, if the user continues to linger on the card 200a (or if the user presses the "Select" button 124), the video window 402 may be enlarged 402 to fill the entire display screen 104. Other types of cards 200 may exhibit different types of behaviors when the card 200 remains in the focus area 302 for an established period of time.

Where the cards 200 represent live television programs, a card 200 corresponding to the currently-tuned channel (at the current date and time) may be selected by default for display in the focus area 302 each time the GUI 110 is shown. This may occur, for instance, when the user is watching TV and presses a button (such as the "Select" button 124) in order to display the GUI 110. Additionally, an indication of the currently-displayed card 200 in the focus area 302 may be stored in non-volatile memory or otherwise maintained such that if a reset condition occurs (e.g., the STB 106 is rebooted or reset after a power loss, etc.) the last-displayed card 200 may be restored to the focus area 302.

Figure 5:
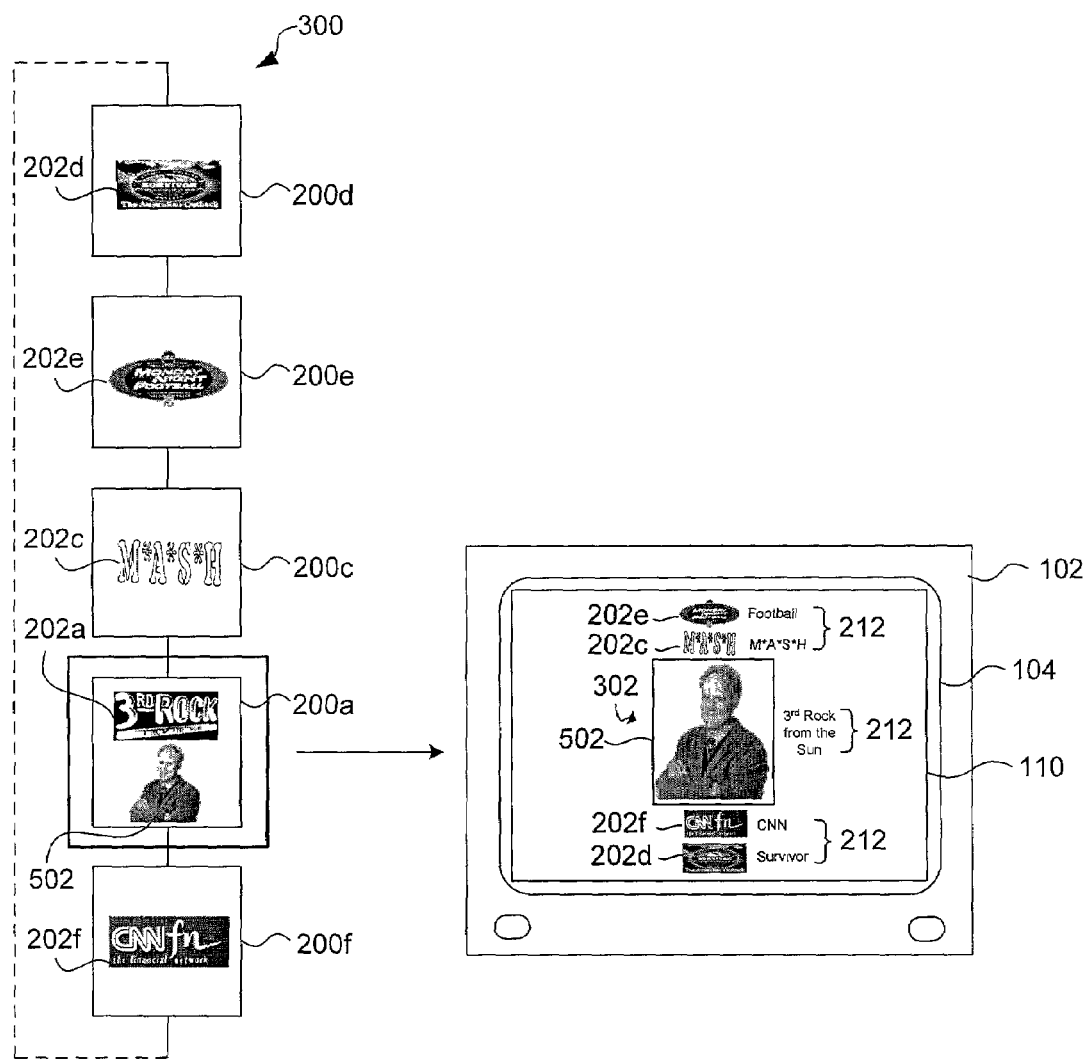

Referring to FIG. 5, cards 200 may include one or more alternative graphical representations 502, which may be displayed when the card 200 enters the focus area 302. As depicted, cards 200c-f displayed outside of the focus area 302 are shown using a first graphical representation 202c-f. However, when the card 200a enters the focus area 302, the alternative graphical representation 502 is shown. Providing an alternative graphical representation 502 allows a designer to provide a more detailed or higher-resolution image for display in the focus area 302, which may be enlarged relative to other graphical representations 202 outside of the focus area 302.

In certain implementations, various types of supplemental information, such as text descriptions 212, may be displayed next to the graphical representations 202, 502 in the GUI 110 to aid the user in identifying and knowing the status of the corresponding options. Sometimes a graphical representation 202 may simply be a picture or logo, which may not be familiar to every user. The addition of a text description 212 is helpful in such cases.

The text description 212 may be displayed above, below, or to the side of the graphical representation 202, 502. Moreover, the text may be of a suitably large size to be easily discernable by the user from a normal viewing distance. During navigation, the text descriptions 212 are shifted or cycled with the corresponding graphical representations 202, 502.

In the depicted embodiment, the text descriptions 212 identify a television programs or series, and are shown to the right of the corresponding graphical representations 202. Of course, many other types of text descriptions 212 may be provided, and different placements or orientations of the text descriptions 212 are contemplated.

Figure 6:
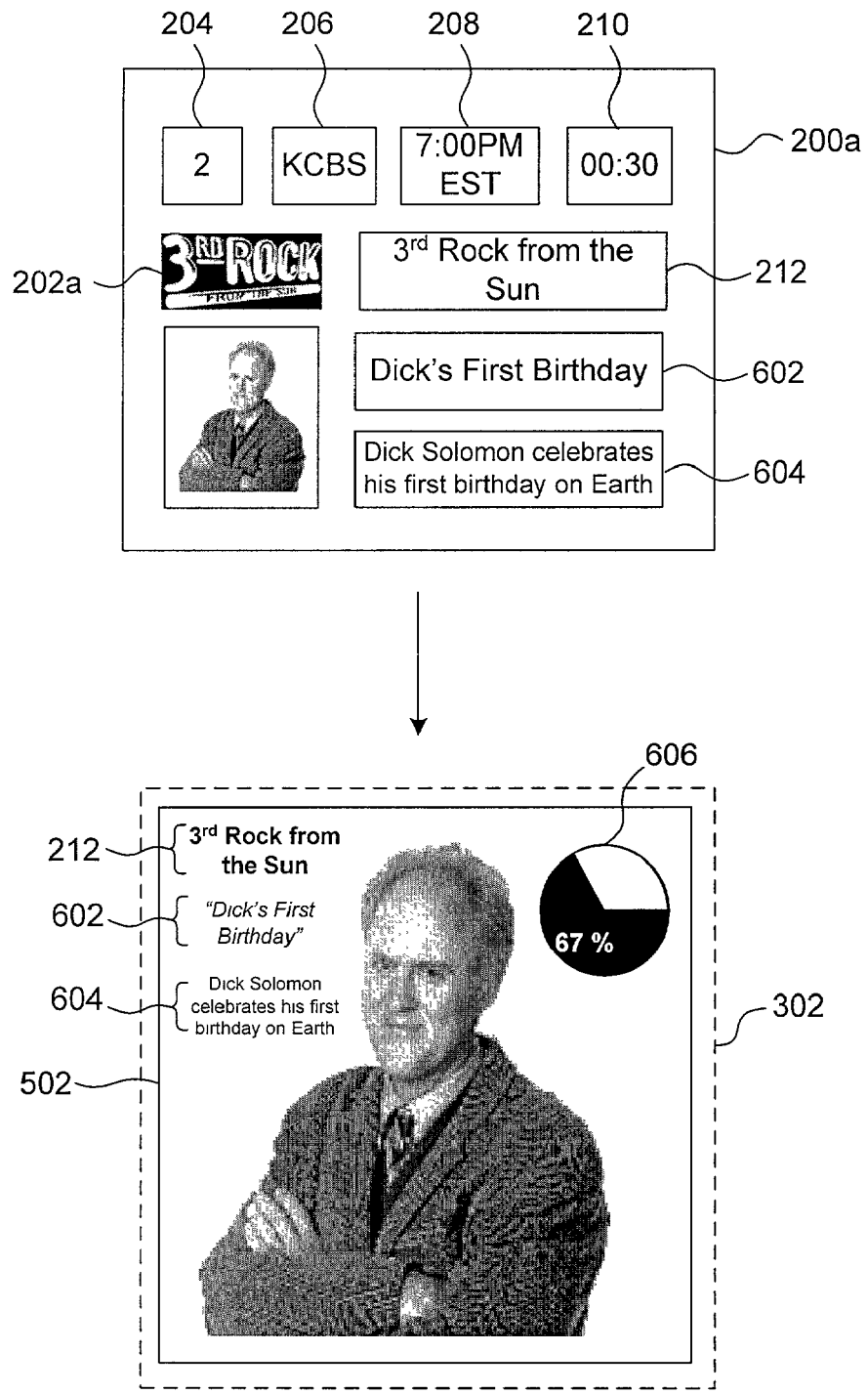

As shown in FIG. 6, a text description 212 may be overlaid or superimposed over a graphical representation 202, 502. This may be accomplished using various techniques, such as configuring a displayed card 200 with multiple graphical "layers", each layer representing either the graphical representation 202, 502, a text description 212, or other display element.

In the depicted embodiment, a card 200 may include or be associated with other types of supplemental information, such as a title 602 and/or synopsis 604, each of which may be likewise superimposed over the graphical representation 502. All such information displayed on or in connection with a card 200 is considered to be within the scope of the invention.

In other embodiments, a program completion indicator 606 may be displayed on or near a graphical representation 202, 502 of a card 200. The program completion indicator 606 graphically (and/or textually) indicates the amount of a live television program that has been missed and/or is left to watch. The indicator 606 may take various forms, such as the pie chart of FIG. 6 or the bar graph of FIG. 7. Additionally, the indicator 606 may include a numerical percentage indicative of the program's completion status. Such an indicator 606 may be valuable to a user in deciding whether to watch a program, particularly where a program is nearing completion.

The ITV system 100 may include a clock (not shown) that maintains an indication of the current time. Based on the starting time 208 associated with a card 200, the ITV system 100 may calculate how much of the program has been missed and generate an appropriate graph and/or text message. For instance, as shown in FIG. 6, if the current time is 7:40 PM, a pie chart may indicate that 67% of "$3^{rd}$ Rock from the Sun" has been missed. In the depicted embodiment, the program completion indicator 606 may be superimposed over the graphical representation 502 as described above.

Figure 7:
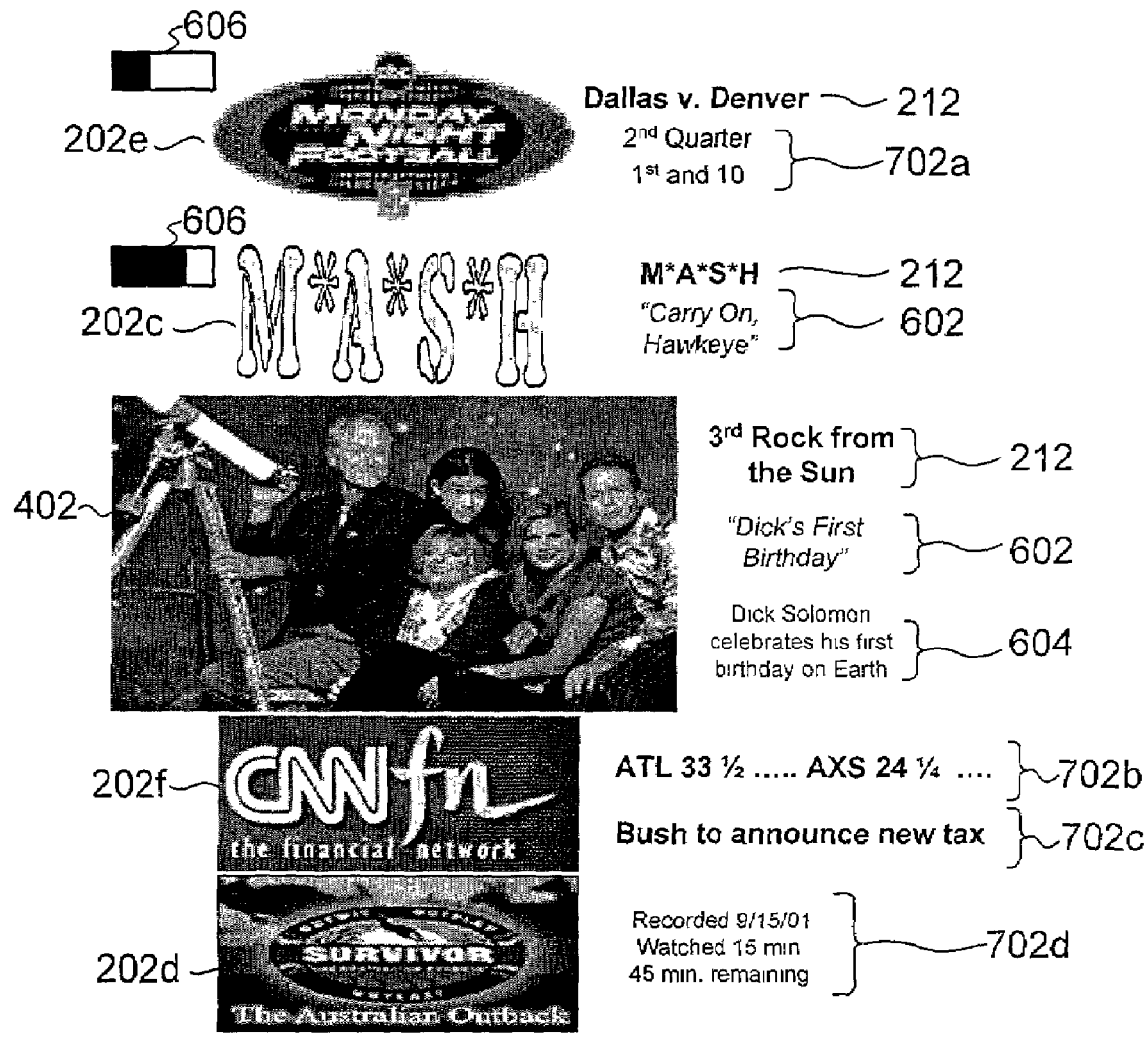

Referring to FIG. 7, a displayed card 200 may be accompanied by an status indicator 702 that provides status information concerning the represented option. For instance, status indicator 702 may relate to the current status (i.e. position, standing, state of affairs, condition, situation) of people, things, or events within an ongoing (live) television program.

For example, during a sporting event, such as a football or baseball game, the status indicator 702a may display the score, field position, down, inning, strike count, clock, etc. In other embodiments, the status indicator 702 may indicate a person being interviewed on a talk show, the current prize level or question in a suitable game show (e.g., "Who Wants to be a Millionaire®"), or a description of an item being currently offered on a shopping channel (e.g., QVC®).

In other embodiments, the status indicator 702 may relate generally to the subject matter of a represented television program and not to any event being currently depicted. For instance, in the case of a card 200 representing CNN/fn®, a status indicator 702b may be embodied as a stock ticker. Alternatively, a status indicator 702c could include a news headline. Similarly, a weather forecast could be shown in connection with a card 200 representing The Weather Channel®.

The status indicator 702 may be generated from information stored within the card 200. For instance, where a sporting event is being tape delayed, score information may be stored within a corresponding card 200, which may then be received by the ITV system 100. Alternatively, where the ITV system 100 already includes a card 200 representing the sporting event, score information within the card 200 may be updated using various techniques, such as ATVEF triggers. In still other embodiments, the ITV system 100 may not store such information within a card 200, but may include a link, such as a URL, to a website from which the information may be retrieved on demand using HTTP or other suitable protocols.

In one configuration, a card 200 may represent a television program recorded by a PVR application with the ITV system 100. The card 200 may include a file or path name (not shown) to a media file stored within a hard disk drive or the like of the ITV system 100. In such an embodiment, the status indicator 702c may indicate when the program was recorded, whether the program has been watched, and/or how much of the program is left to watch.

Of course, a variety of other status indicators 702 may be provided for different types of cards 200 indicating the status of functions, operations, or tasks associated with a represented option. All such status indicators 702 used in connection with cards 200 are considered to be within the scope of the invention.

A variety of other supplemental information may be provided, including, without limitation, indications of similar programs, reminders of new episodes to watch or record, purchasing opportunities, indications of other programs with the same genre, stars, etc., and promotional references to associated programs or services.

All of the above-described supplemental information that may be displayed with cards 200, e.g., text descriptions 212, titles 602, synopses 604, program completion indicators 606, status indicators 702, and the like, may be fully user configurable, such that a user may decide whether and how much of such information may be displayed. Moreover, the makeup and organization of displayed sequences 300 of cards may be configured by a user in any suitable manner.

Figure 8:
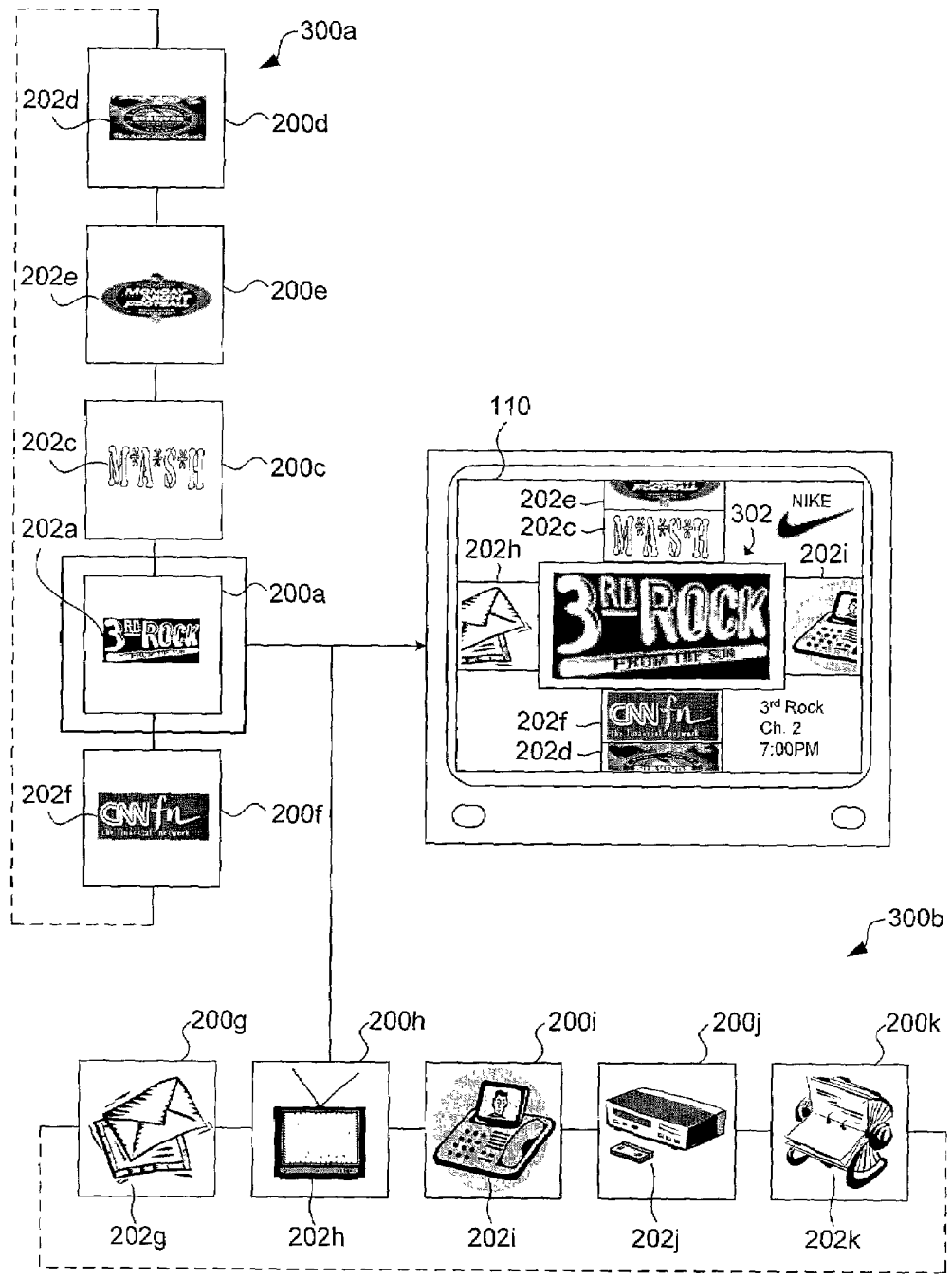

Referring to FIG. 8, multiple sequences 300a-b including different types of cards 200 may be displayed simultaneously. For instance, one or more cards 200 from a sequence 300a representing television programs may be displayed as described in reference to FIG. 4. In addition, one or more cards 200 from a sequence 300b representing interactive channels, applications, or digital media, may also be displayed.

As illustrated, the second sequence 300b may be displayed horizontally, perpendicular to the first sequence 300a, such that the sequences 300a-b intersect at (and define) the focus area 302. Any number of sequences 300 may be displayed on the GUI 110 simultaneously. Of course, the selection of vertical and horizontal for the sequences 300a-b is merely exemplary and not required.

In the depicted embodiment, the "Up" and "Down" buttons 116, 118 may be used to shift or cycle the vertically-displayed sequence 300a within the GUI 110 in order to bring one of the corresponding cards 200a-e into the focus area 302. Likewise, the "Left" and "Right" buttons 120, 122 may be used to shift or cycle the horizontally-displayed sequence 300b to bring one of the corresponding cards 200g-k into the focus area 302.

In one implementation, bringing a card 200 from one sequence 300 into the focus area 302 will determine or change which other sequence 300 is displayed. For example, bringing the card 200h (TV shape) from the horizontal sequence 300b into focus may result in the vertical sequence 300a (television programs) being displayed. Alternatively, bringing the card 200g (envelope shape) into focus may result in a vertical sequence 300 (not shown) corresponding to e-mail messages or contacts. Likewise, bringing the card 200i (videophone shape) into focus may result in a vertical sequence 300 of a videoconferencing buddy list, while the card 200j (VCR shape) may display a vertical sequence 300 of television programs recorded by a PVR. In alternative embodiments, a selection from a vertical sequence 300 may affect which horizontal sequence 300 is displayed.

Figure 9:
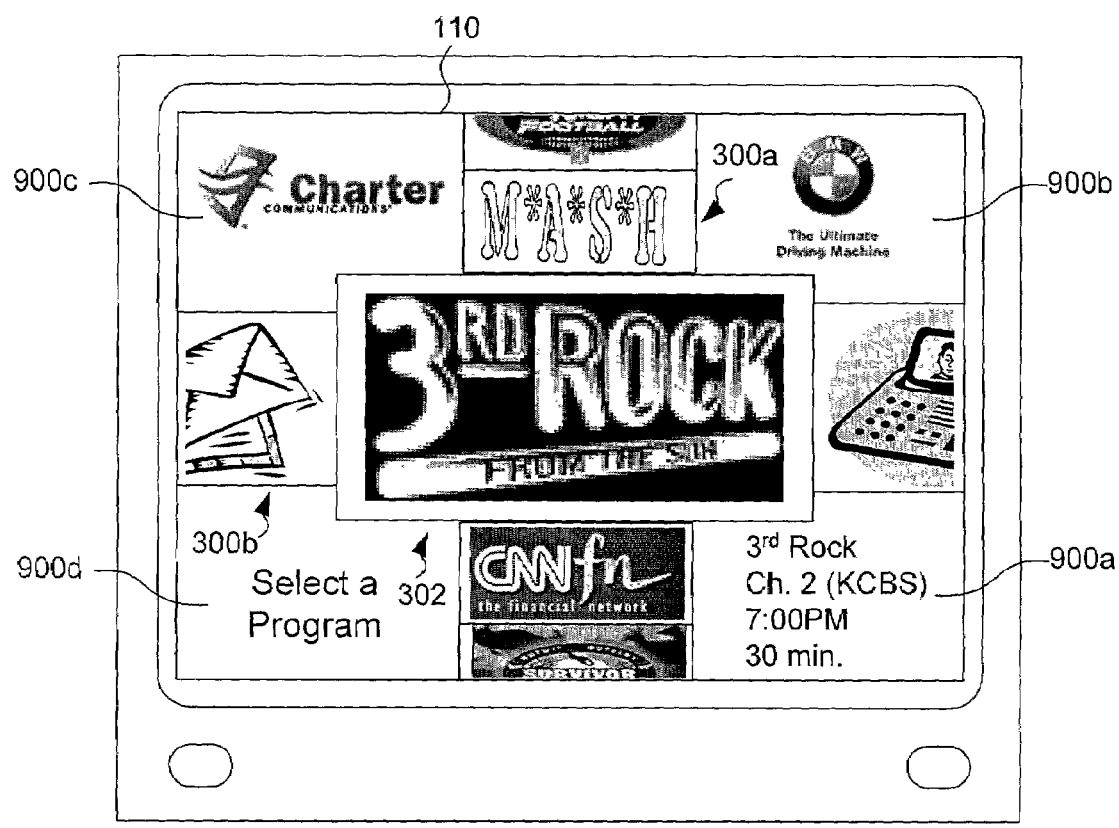

As shown in FIG. 9, the intersection of two displayed sequences 300a-b may generate quadrants 900 that may be used for various purposes. In one embodiment, the quadrants 900 are context-sensitive regions that display supplemental information, advertising, or the like, depending on the card 200 in the focus area 302. In other embodiments, one or more quadrants 900 may display information targeted to the user based on user profile information within the ITV system 100.

In the depicted embodiment, the lower right quadrant 900a may contain detailed information about the card 200 being displayed in the focus area 302. In the case of a card 200 representing a television program, the quadrant 900a may display information taken from the channel number 204, channel name or identifier 206, starting time 208, running time 210, and/or text description 212 associated with the card 200.

The upper right quadrant 900b may include context-sensitive, context-insensitive, or user-targeted information. For example, in an episode of "3$^{rd}$ Rock from the Sun" featuring Dick Solomon driving a new BMW, a corresponding advertisement may be shown. The advertisement may be displayed in response to receipt of an ATVEF trigger, although other mechanisms may be used within the scope of the invention.

The upper left quadrant 900c may be used for branding purposes. For instance, as shown in FIG. 9, the quadrant 900c may show a logo for a cable or satellite provider associated with the ITV system 100. In certain implementations, the quadrant 900c may be context-sensitive, displaying branding corresponding to the particular vertical and/or horizontal sequences 300a-b or cards 200 being displayed.

Finally, the lower left quadrant 900d may be used to display system notes and instructional text. For example, where the user is navigating a sequence 300a of cards 200 corresponding to television programs, instructional text may be provided that prompts the user to select a television program.

The relative sizes of the quadrants 900 may vary depending, for instance, on the location of the intersection of the displayed sequences 300a-b (which need not be in the center of the GUI 110). If the intersection is near the center of the GUI 110, the quadrants may be equal in size; otherwise, the relative sizes of the quadrants 900 may vary.

In alternative embodiments, a single vertical or horizontal sequence 300a-b may result in the creation of hemispheres (not shown) rather than quadrants 900. In still other embodiments, multiple vertical or horizontal sequences 300a-b may result in the creation of any number of context-sensitive regions.

Figure 10:
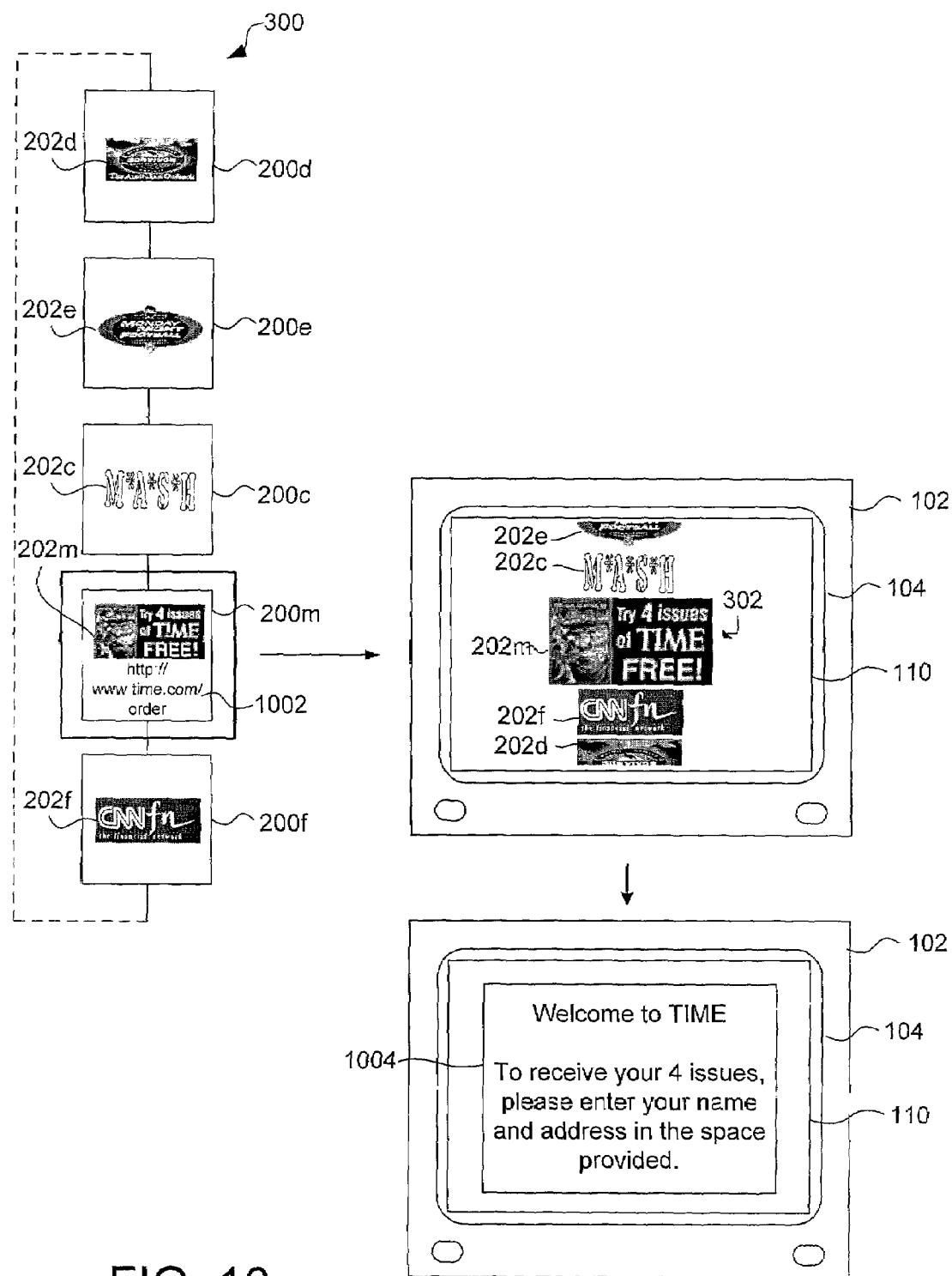

As illustrated in FIG. 10, different types of cards 200 may be included within a single sequence 300. For example, cards 200c-f may correspond to television programs, while card 200m represents a purchase opportunity. In the depicted embodiment, card 200m includes a graphical representation 202m (advertisement), as well as a link or network address 1002, such as a uniform resource locator (URL), to a commercial website.

If the card 200m remains in the focus area 302 for a sufficiently long period, or if the user presses the "Select" button 124, the displayed sequence 300 may be replaced by a web browser 1004, which is automatically directed to the network address 1002 associated with the card 200m. Thereafter, the user may elect to proceed with the purchase opportunity or return to the displayed sequence 300 of cards 200.

Figure 11:
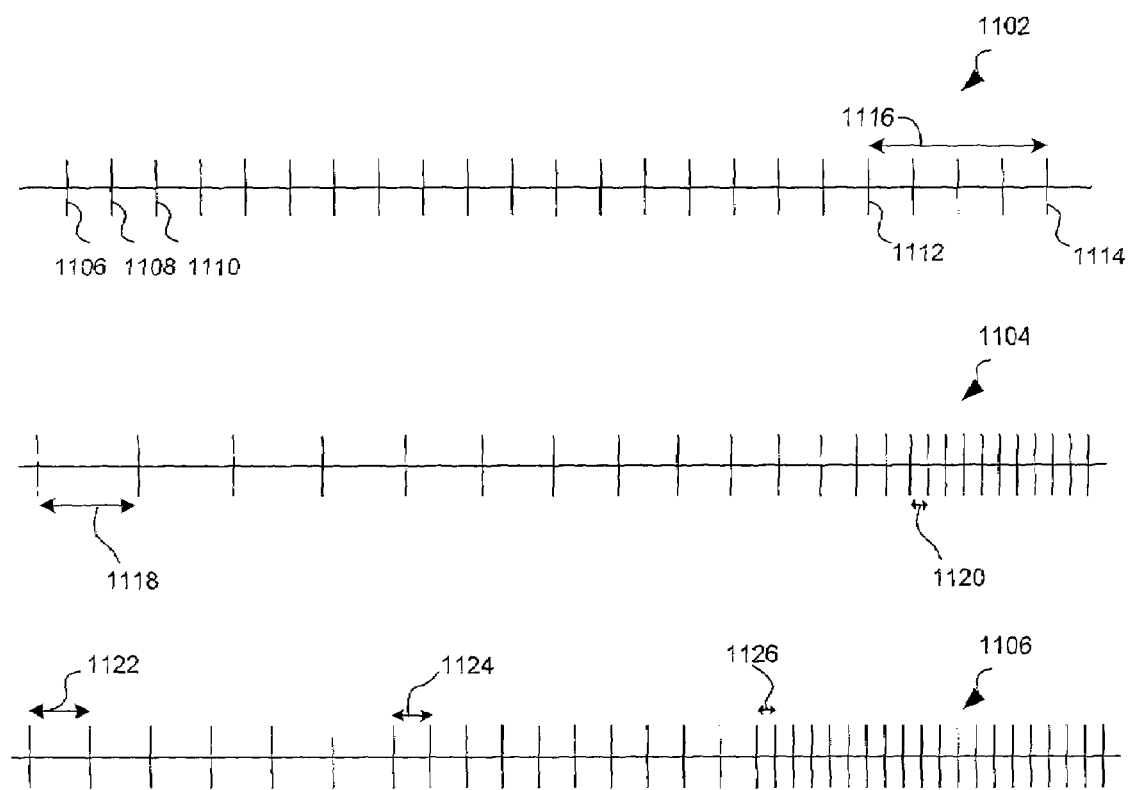
FIG. 11 is a timing diagram for displaying a sequence of cards.

Referring to FIG. 11, there are shown three timing diagrams 1102, 1104, 1106 illustrating the successive display of cards 200 according to embodiments of the invention. Each vertical line within the timing diagrams represents a moment in time at which a particular card 200 is displayed. In diagram 1102, after a single user action, cards 200 are successively displayed at moments 1106, 1108, 1110, and so on. When the user takes some additional action to discontinue navigation, the successive display of cards 200 may be halted at moment 1112.

In certain instances, the user's delayed response may be automatically compensated for by reverting to a previously displayed card 200 once the user halts the successive display. For example, if a card 200 representing a desired channel is displayed within the GUI 110 at moment 1112, but the user takes the additional action to discontinue navigation at moment 1114, the ITV system 100 may be configured to automatically revert to the card 200 displayed a suitable amount of time 1116 before the action was taken. The amount of time may be preset or user-defined, or may be calculated based on historical user reaction times.

The rate at which the cards 200 are successively displayed may be increased in response to the user taking a suitable action. For example, as shown in timing diagram 1104, the rate at which cards 200 are successively displayed may gradually increase from a minimum rate 1118 to a maximum rate 1120 (preferably at or below the user's image recognition limit). Alternatively, as shown in timing diagram 1106, the display rate may increase from a minimum rate 1122 to an intermediate rate 1124 to a maximum rate 1126 according to a stepwise function. The user action to increase the display rate may take many forms, such as holding down a button on the remote control 108 for a set amount of time. In such case, the rate may be increased based on how long the button is held down. Alternatively, the user may increase the display rate by repeatedly pressing a button on the remote control 108, in which case the rate may be increased each time the button is pressed.

Figure 12:
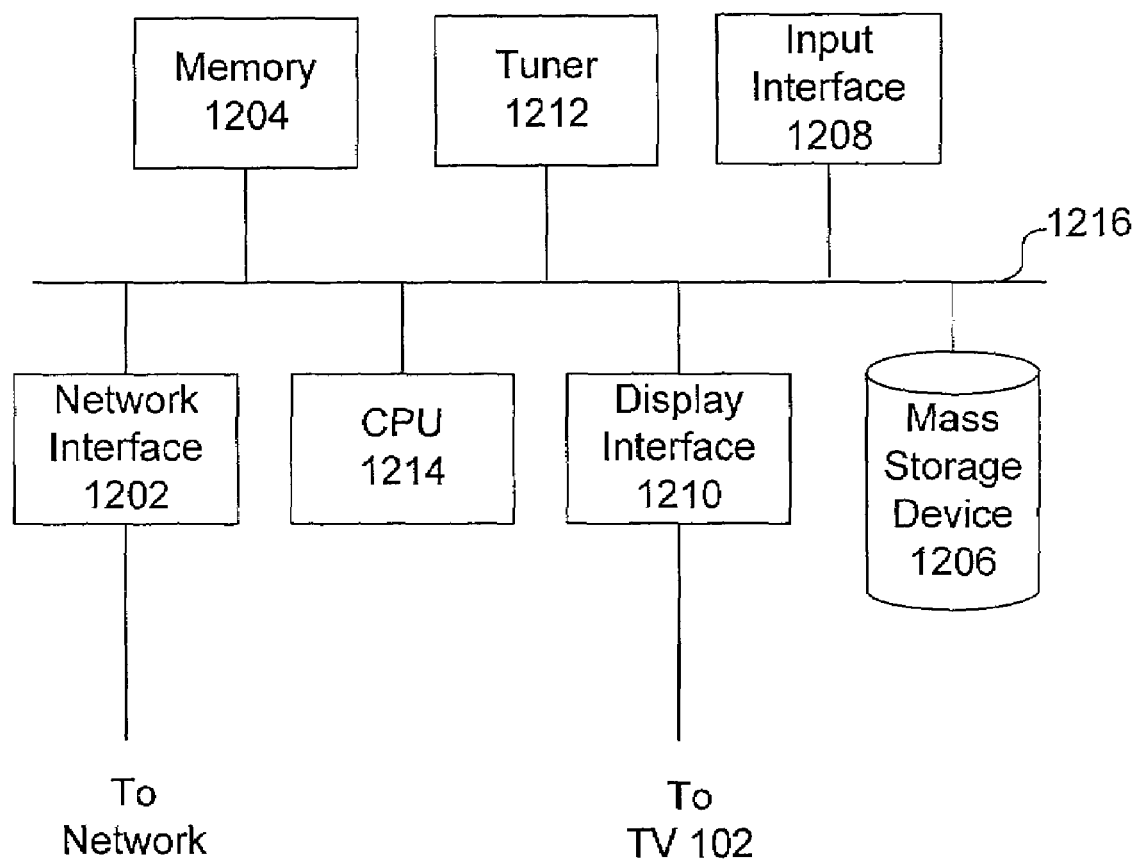
FIG. 12 is a schematic block diagram of a set-top box (STB)

FIG. 12 is a schematic block diagram of an STB 106 according to an embodiment of the invention. The illustrated components may be logical or physical and may be implemented using any suitable combination of hardware, software, and/or firmware.

In one configuration, the STB 106 includes a network interface 1202 for communicating with a broadband network, such as a cable television network or a DBS (Direct Broadcast Satellite) network. The network interface 1202 may conform to the DOCSIS (Data Over Cable Service Interface Specification) or DAVIC (Digital Audio-Visual Council) cable modem standards. Additionally, the network interface 1202 may include standard circuitry for receiving MPEG (Moving Picture Experts Group) streams including multiplexed television programs and data from the broadband network.

One or more sequences 300 of cards 200 may be received by the interface 1202 from a server accessible via the broadband network or the Internet. Additionally, the network interface 1202 may be used to retrieve status indicators 702, such as sports scores, stock tickers, news headlines, and the like, which may be displayed on or near a card 200. Such indicators 702 may be retrieved via HTTP, ATVEF triggers, or the like.

The STB 106 further includes a memory 1204, such as a random access memory (RAM) and/or read-only memory (ROM). The memory 1204 may store an operating system (OS) for the STB 106 (e.g., Windows CE® or Linux®), application program code, and various types of data. In one embodiment, the memory 1204 stores one or more sequences 300 of cards 200, as well as data for status indicators 702. In other embodiments, the sequences 300 may be stored within a mass storage device 1206, such as a hard disk drive, optical storage device, or the like.

An input interface 1208 may be provided for receiving commands from an input device, such as a remote control 108. In one embodiment, the input interface 1208 may include or be associated with the wireless receiver 114 described in connection with FIG. 1. The input interface 1208 may detect a single user action for initiating navigation, such as the user pressing the "Up" or "Down" buttons 116, 118 on the remote control 108.

The STB 106 may further include a display interface 1210 for generating a GUI 110 on an attached TV 102 or other display device. In addition, the display interface 1210 may be responsible for successively displaying cards 200 from one or more stored sequences 300 in a focus area 302 of the GUI 110 in response to the single user action being detected by the input interface 1208, as previously described. Likewise, the display interface 1210 may be responsible for halting the successive display in response to detection of a subsequent user action. Additionally, the display interface 1210 may be used to display various types of supplemental information on or in connection with cards 200, such as text descriptions 212, program completion indicators 606, status indicators 702, and the like. The display interface 1210 may be adapted to display supplemental information with the corresponding graphical representation 202, 502 using different graphical layers, which are combined to form the card 200 as displayed in the GUI 110.

A tuner 1212 may be included for demodulating and demultiplexing selected MPEG streams received by the STB 106 from the broadband network. The tuner 1212 may be used to tune to a particular television program in response to a user selection of a card 200, e.g., in response to the user pressing the "Select" button 124 or when the user "lingers" on a card 200 in the focus area 302.

A CPU 1214 controls the operation of the STB 106, including the other components described above, which may be in electrical communication with the CPU 1214 via a bus 1216. The CPU 1214 may be embodied as a microprocessor, a microcontroller, a digital signal processor (DSP) or other device known in the art. For instance, the CPU 1214 may be embodied as an Intel® x86 processor. The CPU 1214 may perform logical and arithmetic operations based on program code stored within the memory 1204 or the mass storage device 1206.

Of course, FIG. 12 illustrates only one possible configuration of an STB 106. Those skilled in the art will recognize that various other architectures and components may be provided within the scope of the invention. In addition, various standard components are not illustrated in order to avoid obscuring aspects of the invention.

Figure 13:
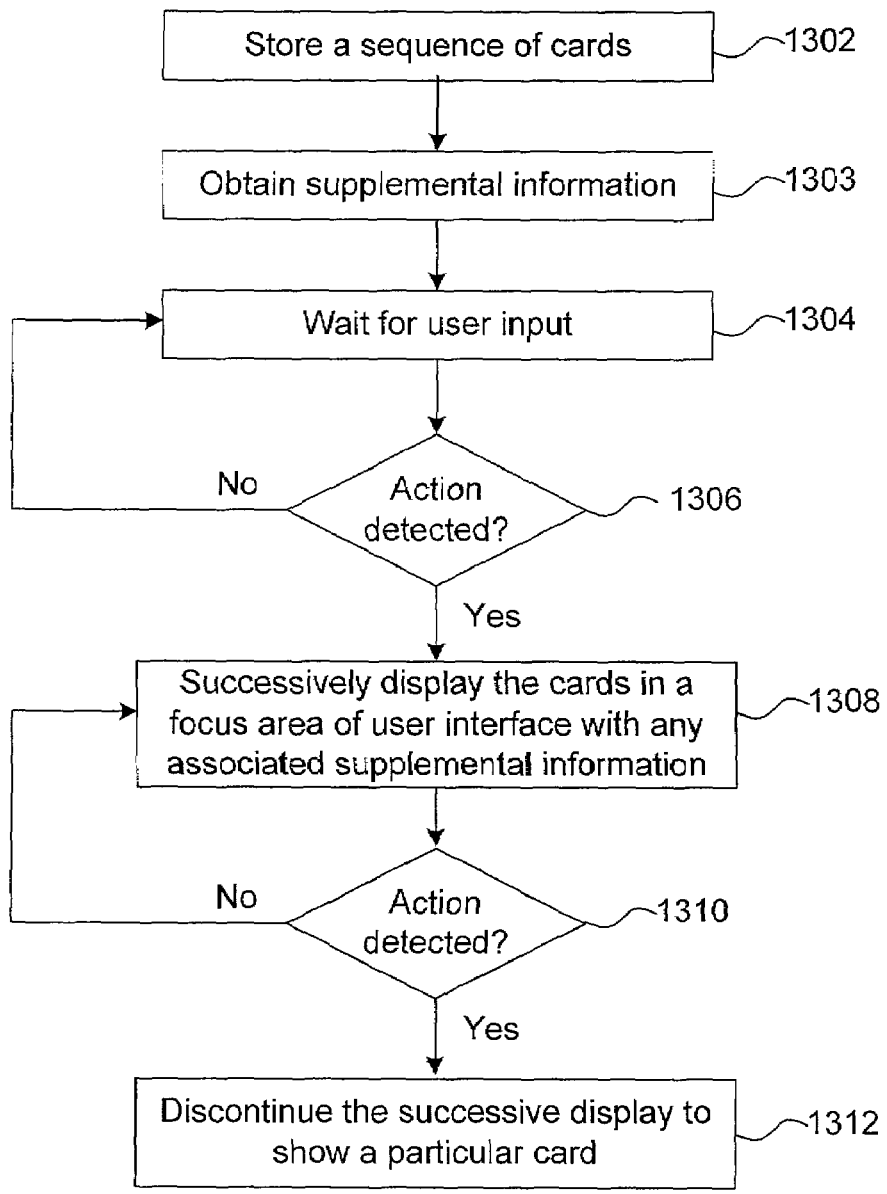
FIG. 13 a flowchart of a method for focused navigation of a plurality of options within a user interface.

Referring to FIG. 13, there is shown a flowchart of a method 1300 for focused navigation of a plurality of options within a GUI 110. The method 1300 begins by storing 1302 a sequence 300 of cards 200 representing channels or other available options within an ITV system 100. Supplemental information not already included within a card 200 may also be obtained 1303, such as a status indicator 702, using HTTP, ATVEF triggers, or other techniques. The supplemental information may be pre-cached by the ITV system 100 prior to the cards 200 being displayed or may be retrieved just in time to be displayed with the corresponding cards 200.

In one configuration, the method 1300 waits 1304 for user input. When a single user action is detected 1306, as previously discussed, the cards 200 from the sequence 300 are successively displayed 1308 in a focus area 302 of the GUI 110. In addition, any supplemental information associated with the cards 200 may also be displayed within or outside of the focus area 302. This successive display continues until a subsequent user action is detected 1310, at which point the successive display is discontinued and a single card 200 corresponding to a selected option is displayed 1312 within the focus area 302.

Thereafter, depending on the particular type of card 200, various actions may be taken if the user actively selects the card 200 (e.g., presses the "Select" button 124 on the remote control 108) or waits beyond an established time period to either select the card 200, continue navigation, or take some other action. For example, a card 200 in the focus area 302 may be replaced by a video window 402 showing a live television program after a period of inaction (lingering) by the user.

In view of the foregoing, the present invention offers a number of advantages not available in conventional approaches. Cards representing available channels or options within an ITV system may be successively and rapidly displayed within a focus area. Because navigation is initiated by a single user action, the user need not repeatedly press a button to display each channel, as is often the case with conventional TV or ITV interfaces. This greatly increases navigation speed, reduces wear on the remote control, and reduces the likelihood of discomfort or injury to the user's hand.

Likewise, because the cards are all displayed within a single area of the user interface (i.e. the focus area), the cards may be displayed at a relatively high rate of speed, while still being within the user's image recognition threshold. Typically, the focused navigation technique of the claimed invention allows a user to more quickly and efficiently locate and select a desired option than conventional approaches where a large number of available options exist.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for navigating a plurality of options within a user interface, the method comprising:
    displaying a first sequence of cards along a first axis of the user interface, each card graphically representing a single respective option from a first set of options;
    scrolling only the first sequence of cards along the first axis through a focus area of the user interface without scrolling any cards not in the first sequence;
    in response to a first card being scrolled into the focus area without being otherwise selected by a user, displaying a second sequence of cards along a second axis of the user interface, each card of the second sequence graphically representing a single respective option from a second set of options, the second axis being perpendicular to the first axis;
    obtaining supplemental information related to at least two cards in the second sequence;

displaying the supplemental information adjacent to but outside of the respective at least two cards; and scrolling only the second sequence of cards along the second axis through the focus area without scrolling any cards not in the second sequence, wherein the supplemental information for the at least two cards is scrolled substantially parallel to the second axis to maintain a relative position of the supplemental information to the respective at least two cards, wherein the focus area is fixed relative to the first axis and to the second axis such that the focus area does not move as cards are scrolled along the first axis or the second axis, and wherein a representation of only one option at a time is scrolled through the focus area.

2. The method of claim 1, wherein the
supplemental information of a selected one of the at least two cards comprises a plurality of supplemental information items, the method further comprising:

displaying the plurality of supplemental information items in different positions adjacent to but outside of the selected one of the at least two cards.

3. The method of claim 1,
wherein a first one of the plurality of supplemental information items comprises textual information and a second one of the plurality of supplemental information items comprises graphical information.

4. The method of claim 1, wherein the supplemental information comprises textual information.

5. The method of claim 4, wherein the textual information is selected from the group consisting of a title, a description, and a synopsis.

6. The method of claim 1, wherein the supplemental information comprises a program completion indicator.

7. The method of claim 6, wherein the program completion indicator graphically indicates how much of television program has been missed.

8. The method of claim 6, wherein the program completion indicator graphically indicates how much of a television program remains to be watched.

9. The method of claim 6, wherein the program completion indicator comprises one of a pie chart, a bar graph, and a numerical percentage.

10. The method of claim 1, wherein the supplemental information comprises a status indicator.

11. The method of claim 10, wherein the status indicator provides a status of an event being depicted in a television program.

12. The method of claim 11, wherein the event comprises a sporting event, and wherein the status comprises a score.

13. The method of claim 10, wherein the status indicator comprises a stock ticker.

14. The method of claim 10, wherein the status indicator comprises a news headline.

15. The method of claim 10, wherein the status indicator comprises a weather forecast.

16. The method of claim 10, wherein the status indicator indicates that a television program represented by the first card has been recorded.

17. The method of claim 10, wherein the status indicator indicates that a recorded television program represented by the first card has been watched.

18. The method of claim 10, wherein the status indicator indicates how much of a recorded television program represented by the first card has been watched.

19. The method of claim 1, wherein the first card comprises a network address, and wherein the supplemental information is retrieved through a network using the network address.

20. The method of claim 1, wherein the supplemental information is received via an ATVEF trigger.

21. A system for navigating a plurality of options within a user interface, the system comprising:

a memory for storing a first sequence of cards, each card graphically representing a single respective option from a first set of options, wherein the memory is further adapted to store a second sequence of cards, each card in the second sequence graphically representing a single respective option from a second set of options;

a network interface for obtaining supplemental information related to cards in the second sequence;

an input interface for detecting user actions; and a display interface configured to:

scroll only the first sequence of cards along the first axis through a horizontally and vertically fixed focus area of the user interface without scrolling any cards not in the first sequence;

display, in response to the first card being scrolled into the focus area without being otherwise selected by a user, the second sequence of cards along a second axis of the user interface, each card of the second sequence graphically representing a single respective option from a second set of options, the second axis being perpendicular to the first axis;

obtain supplemental information related to at least two cards in the second sequence;

display the supplemental information adjacent to but outside of the respective at least two cards; and scroll only the second sequence of cards along the second axis through the focus area without scrolling any cards not in the second sequence, wherein the supplemental information for the at least two cards is scrolled substantially parallel to the second axis to maintain a relative position of the supplemental information to the respective at least two cards, wherein the focus area is fixed relative to the first axis and to the second axis such that the focus area does not move as cards are scrolled along the first axis or the second axis, and wherein a representation of only one option at a time is scrolled through the focus area.

22. The system of claim 21, wherein the supplemental information of a selected one of the at least two cards comprises a plurality of supplemental information items, and wherein the display interface is further adapted to:

display the plurality of supplemental information items in different positions adjacent to but outside of the selected one of the at least two cards.

23. The system of claim 21, wherein a first one of the plurality of supplemental information items comprises textual information and a second one of the plurality of supplemental information items comprises graphical information.

24. The system of claim 21, wherein the supplemental information comprises textual information.

25. The system of claim 24, wherein the textual information is selected from the group consisting of a title, a description, and a synopsis.

26. The system of claim 21, wherein the supplemental information comprises a program completion indicator.

27. The system of claim 26, wherein the program completion indicator graphically indicates how much of television program has been missed.

28. The system of claim 26, wherein the program completion indicator graphically indicates how much of a television program remains to be watched.

29. The system of claim 26, wherein the program completion indicator comprises one of a pie chart, a bar graph, and a numerical percentage.

30. The system of claim 21, wherein the supplemental information comprises a status indicator.

31. The system of claim 30, wherein the status indicator provides a status of an event being depicted in a television program.

32. The system of claim 31, wherein the event comprises a sporting event, and wherein the status comprises a score.

33. The system of claim 30, wherein the status indicator comprises a stock ticker.

34. The system of claim 30, wherein the status indicator comprises a news headline.

35. The system of claim 30, wherein the status indicator comprises a weather forecast.

36. The system of claim 30, wherein the status indicator indicates that a television program represented by the first card has been recorded.

37. The system of claim 30, wherein the status indicator indicates that a recorded television program represented by the first card has been watched.

38. The system of claim 30, wherein the status indicator indicates how much of a recorded television program represented by the first card has been watched.

39. The system of claim 21, wherein the first card comprises a network address, and wherein the network interface is further adapted to retrieve the supplemental information through a network using the network address.

40. The system of claim 21, wherein the network interface is further adapted to receive the supplemental information via an ATVEF trigger.

41. A method for navigating a plurality of options within a user interface of an interactive television system, the method comprising:
displaying only cards from a first sequence of cards along a horizontal axis of the user interface, each card graphically representing a single respective interactive application associated with the interactive television system;
in response to a single user action, horizontally scrolling only the cards from the first sequence along the horizontal axis through a focus area of the user interface without scrolling any cards not in the first sequence to progressively change the card within the focus area to a next card in the first sequence;
in response to a first card from the first sequence being scrolled into the focus area without a user initiating a selection action with respect to the first card, displaying a second sequence of cards along a vertical axis of the user interface, each card of the second sequence graphically representing a single respective option corresponding to the interactive application represented by the first card;
obtaining supplemental information related to at least two cards in the second sequence;
displaying the supplemental information adjacent to but outside of the respective at least two cards; and
scrolling only the cards from the second sequence of cards along the second axis without scrolling any cards not in the second sequence to progressively change the card within the focus area to a next card in the second sequence, wherein the supplemental information for the at least two cards is scrolled on the second axis to maintain its relative position to the respective at least two cards, wherein the focus area is fixed relative to the first axis and to the second axis such that the focus area does not move as cards are scrolled along the first axis or the second axis, and wherein a representation of only one interactive application or option at a time is scrolled through the focus area.

42. A system for navigating a plurality of options within a user interface, the system comprising:
means for displaying a first sequence of cards along a first axis of the user interface, each card graphically representing a single respective option from a first set of options;
means for scrolling only the first sequence of cards along the first axis through a horizontally and vertically fixed focus area of the user interface in response to a single user action without scrolling any cards not in the first sequence;
means for displaying, in response to a first card being scrolled into the focus area without being otherwise selected, a second sequence of cards along a second axis of the user interface, each card of the second sequence graphically representing a single respective option from a second set of options, the second axis being perpendicular to the first axis;
means for obtaining supplemental information related to at least two cards in the second sequence;
displaying the supplemental information adjacent to but outside of the respective at least two cards; and
means for scrolling only the second sequence of cards along the second axis through the focus area without scrolling any cards not in the second sequence, wherein the supplemental information for the at least two cards is scrolled substantially parallel to the second axis to maintain a relative position of the supplemental information to the respective at least two cards, wherein the focus area is fixed relative to the first axis and to the second axis such that the focus area does not move as cards are scrolled along the first axis or the second axis, and wherein a representation of only one option at a time is scrolled through the focus area, and wherein no card in the first sequence displayed along the first axis is subsequently scrollable along the second axis.

43. A computer-readable medium comprising program code for performing a method for navigating a plurality of options within a user interface, the method comprising:
displaying a first sequence of cards along a first axis of the user interface, each card graphically representing a single respective option from a first set of options;
scrolling only the first sequence of cards along the first axis through a focus area of the user interface in response to a single user action without scrolling any cards not in the first sequence;
in direct response to a first card being scrolled into the focus area, displaying a second sequence of cards along a second axis of the user interface, each card of the second sequence graphically representing a single respective option from a second set of options, the second axis being perpendicular to the first axis;
obtaining supplemental information related to at least two cards in the second sequence;
displaying the supplemental information adjacent to but outside of the respective at least two cards; and
scrolling only the second sequence of cards along the second axis through the focus area without scrolling any cards not in the second sequence, wherein the supplemental information for the at least two cards is scrolled substantially parallel to the second axis to maintain a relative position of the supplemental information to the respective at least two cards, wherein the focus area is fixed relative to the first axis and to the second axis such that the focus area does not move as cards are scrolled along the first axis or the second axis, and wherein no card is scrollable along both the first and second axes, and wherein a representation of only one option at a time is scrolled through the focus area.

44. The method of claim 1, wherein the options in the first set are of a first type, and wherein the options in the second set are of a second type.

* * * * *